June 4, 1963          C. M. CLARK          3,092,751

PULSE ANALYZING

Original Filed June 28, 1957          5 Sheets-Sheet 1

FIG.1

INVENTOR
CALVIN M. CLARK
BY
ATTORNEYS

June 4, 1963

C. M. CLARK 3,092,751

PULSE ANALYZING

Original Filed June 28, 1957

INVENTOR
CALVIN M. CLARK
BY
ATTORNEYS

June 4, 1963    C. M. CLARK    3,092,751
PULSE ANALYZING

Original Filed June 28, 1957    5 Sheets-Sheet 5

FIG. 5

INVENTOR
CALVIN M. CLARK
BY
ATTORNEYS

United States Patent Office 3,092,751
Patented June 4, 1963

3,092,751
PULSE ANALYZING
Calvin M. Clark, Fullerton, Calif., assignor to California Research Corporation, San Francisco, Calif., a corporation of Delaware
Original application June 28, 1957, Ser. No. 668,781, now Patent No. 2,968,724, dated Jan. 17, 1961. Divided and this application Sept. 28, 1959, Ser. No. 842,622
2 Claims. (Cl. 315—8.5)

This invention relates to a method of and apparatus for analyzing the amplitude distribution of electrical waveforms and more particularly a method of and apparatus for converting varying amplitude high-frequency intelligence to time modulated signals, transmitting said signals along a well logging cable of limited frequency and power transmission characteristics, storing said signals as discrete segments of circular traces on the storage surface of a cathode-ray storage tube in predetermined locations in accordance with the varying amplitudes of the original high-frequency intelligence and reading from the storage surface the information stored thereon after a predetermined quantity of intelligence has been accumulated for reproduction in a spectrographic form. This application is a division of my copending application Serial No. 668,781, filed June 28, 1957 now Patent No. 2,968,724, dated January 17, 1961 for Pulse Height Analyzer.

In logging of earth formations traversed by a well bore it is frequently desirable to be able to transmit high-frequency forms of intelligence, such as electrical pulses representing gamma ray energies which are of very short duration and very rapidly succeeding each other, over a cable of relatively limited frequency and power transmission characteristics. In particular, it is highly desirable to be able to transmit the electrical pulses corresponding to the individual γ rays generated instantaneously upon interaction of neutrons with nuclei of constituent elements of an earth formation lying several thousand feet below the earth's surface. However, this desire has been found so difficult that the solutions suggested for field practice heretofore have required either that the recording be performed "blind," by means such as camera and film within the well bore adjacent the logging tool, or that the signal be transmitted over commercially unavailable coaxial cables. As particularly explained in the copending application of Delmar O. Seevers, Serial No. 433,244, filed May 28, 1954, which is assigned to the assignee of the present application, these previously known methods of transmitting high-frequency forms of intelligence have been considered so unattractive that they have retarded or prevented the field use of spectral analysis of earth formations by means of γ ray energies. As further explained in the said Seevers application, the intelligence originating in high-frequency form may be transmitted over a standard well logging cable of limited frequency and power transmission characteristics by conversion of the electrical pulses, corresponding to the individual energy of each γ ray detected by a scintillation crystal and photomultiplier tube combination, to an electrostatic charge in a cathode-ray tube having an electrostatic charge modifiable storage surface, then assigning a particular location or position on the storage surface for storage of said charges or pulses in accordance with the energy of each γ ray and subsequently reading out the stored information for transmission in low-frequency form.

In my copending application, Serial No. 451,525, for Circular Scanning System for Recording Nuclear Energy Spectrum, filed August 23, 1954 and assigned to the same assignee as the present application, the advantages provided by polar coordinate storage of the γ ray spectrum have been described. The system of my copending application employs an electrostatic deflection type cathode-ray storage tube. The polar coordinate storage system of that application requires the conversion of the intelligence into its sine-cosine coordinates to produce the polar coordinate deflection pattern on the storage surface of the storage tube.

Present commercially available electromagnetic deflection type cathode-ray storage tubes provide substantially improved resolution over the best electrostatic tubes. The improved resolution increases the storage capacity of the tube by the square of the resolution improvement due to the polar type distribution of the information on the storage surface, thus providing a much more desirable and efficient storage device.

The present application discloses a system employing a cathode-ray storage tube with electromagnetic deflection for positioning the intelligence on the storage surface of the tube in which deflecting field is rotated about the axis of the storage tube to effect the angular rotation of the electron beam of the tube. The intelligence is positioned at varying distances along a radius of the circular scanning pattern of the storage tube in accordance with the energy of the information and is disposed along a circular path as a discrete portion of a trace in accordance with the angular position of the deflection field at the time of recording. Recording of the intelligence is continued in the manner just defined until a predetermined quantity of intelligence counts has been attained or until a selected area of a well bore has been surveyed at which time the intelligence so stored is removed from the storage surface of the tube. This "readout" may be accomplished in any suitable manner, one of which includes the sweeping of the storage surface in a spiral manner about the center of the stored information as an axis. The "readout" procedure is continued until all of the intelligence stored on the face of the tube has been read and an indication of this intelligence has been recorded. The "readout" procedure may also include an erasing process as the intelligence is read or the storage surface may be erased in a subsequent operation to be returned to a condition for subsequent intelligence storage.

An object of the present invention is an improved method for intelligence disposition on the storage surface of a cathode-ray storage tube.

A further object of the present invention in accordance with the preceding object is a method for analyzing the amplitude distribution of electrical wave-forms employing a cathode-ray storage tube having a rotating magnetic deflection system whereby time modulated intelligence derived from the electrical waveforms may be fed directly to the deflection system and storage tube for disposition in accordance with the amplitude distribution thereof.

Another object of the present invention is an electronic circuit arrangement for converting high-frequency intelligence information to time modulated signals for transmission over a cable of limited frequency and power transmission characteristics.

A further object of the present invention in accordance with the preceding object is a well logging system having part of its components within the well bore and part of its components at the surface of the earth formation being logged with the components within the well bore including electronic circuitry for converting intelligence signals of high-frequency characteristic to time modulated signals for transmission along a well logging cable to the components at the earth's surface for disposition at that point.

A further object of the present invention is an improved energization and control system for a cathode-ray storage tube wherein intelligence information is stored on the tube upon the occurrence of coincidence between a voltage of predetermined characteristic and a voltage proportional to said intelligence information.

Further objects and features of the invention will be readily apparent to those skilled in the art from the specification and appended drawings illustrating certain preferred embodiments in which.

Figure 1:
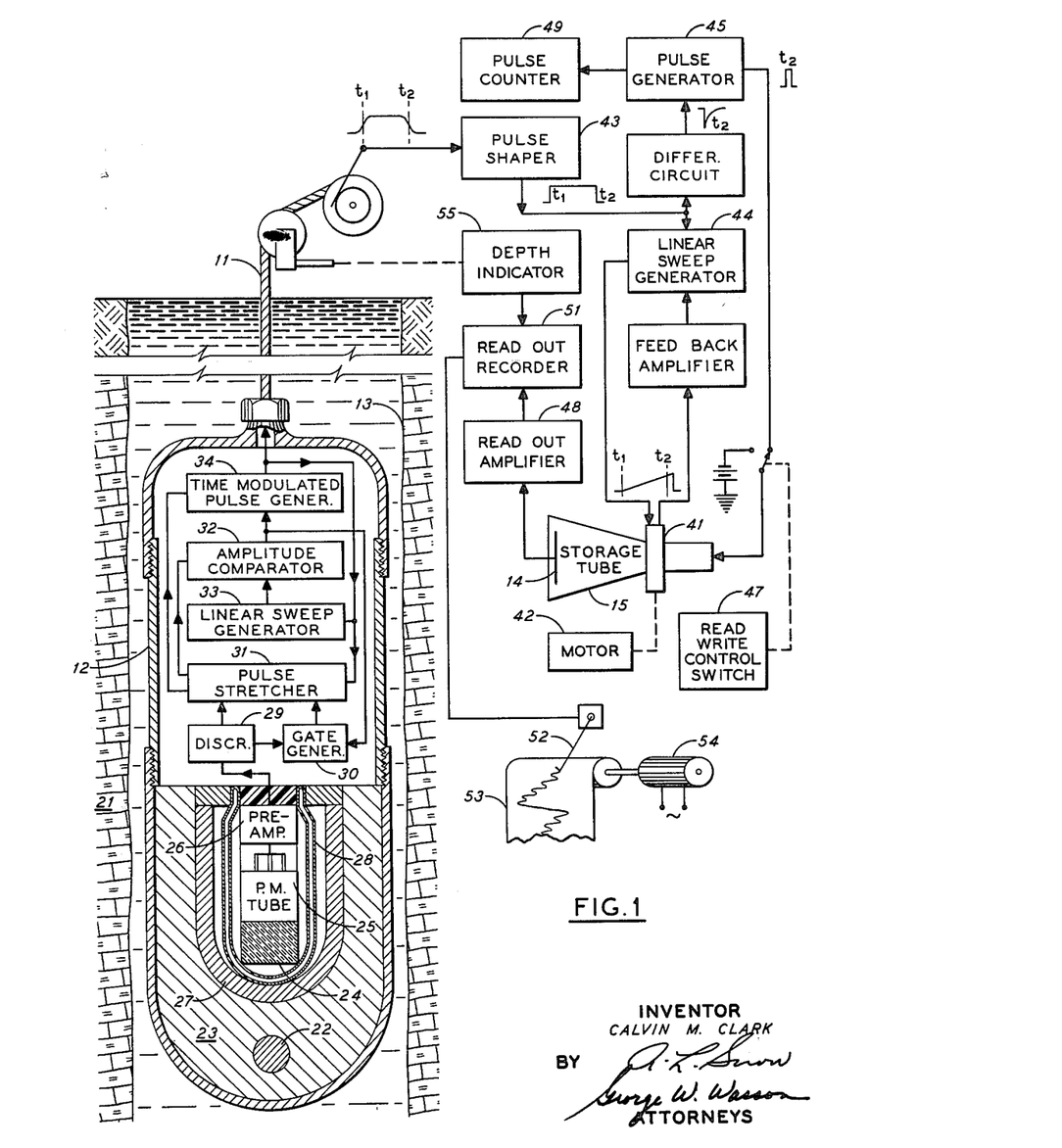
FIG. 1 is a schematic representation of the logging tool as well as the transmitting and recording equipment incorporating the method of the present invention as applies to the logging of γ ray energy spectra.

Referring now to the drawings, and in particular to FIG. 1, there is illustrated a preferred form of apparatus adapted to utilize the method of transmitting intelligence originating in high-frequency form over a well logging cable 11 of limited frequency and power transmission characteristics. As shown, a logging sonde 12, wherein the earth formation analysis and signal generating equipment are located, is adapted to traverse a well bore 13 while supported on the lower end of the logging cable 11. The well logging cable, it should be understood, must have considerable structural strength in order to support the relatively heavy logging sonde 12, as well as several thousand feet of its own length.

In order for the cable to be sufficiently small in diameter to allow for ease in handling in field operations as well as the strength requirements, the power and frequency characteristics must be sacrificed for the strength and handling requirements. In practice the electrical power is restricted to the order of about 150 watts at not over about 200 volts. Accordingly, when it is desired to be able to handle and transmit information representing individual γ ray quanta, it has been found difficult to transmit a sufficient amount and quantity of data corresponding to a large number of channels of pulses of widely varying magnitudes to the earth's surface so that a useful record may be made simultaneous with the running of the logging sonde 12 in the well bore 13. This is due primarily to the fact that these pulses are each of such short duration and follow in such rapid succession that a high-frequency transmission system would be required even when the total amount of information is limited.

In accordance with the present invention and the aforementioned copending applications, there is provided an improved system for storing a complete spectrum, representing as many as 200 channels of γ ray energies of varying magnitude pulses in which each of the pulses is stored as an electrostatic charge on a storage surface 14, of a cathode-ray tube storage tube 15. It should be noted that the schematic representation of the cathode-ray storage tube in the drawings of this application indicates only those elements having a function in the performance of the method of this application and, in this respect, should be considered as merely illustrative of the form the tube may actually take. The storage and readout portions are not separately illustrated but it should be understood that the readout operations may incorporate additional elements within the tube and may function as a secondary emission collector instead of the simplified form as shown.

In the embodiment of the invention illustrated in FIG. 1, the γ ray quanta to be stored on the storage surface 14 of the cathode-ray tube 15 arise from neutron bombardment of the earth's formation, such as 21, by neutrons from source 22, which are captured by nuclei of constituent elements within the formation 21.

The neutron source 22, which may be a polonium beryllium source to give high neutron and low γ ray production, is embedded within a shield 23, such as bismuth to reduce the number of γ rays entering the formation, and further to reduce the number of γ rays of low energy returning from the formation. The individual neutron capture γ ray quanta, characteristic of the individual nuclei in the formation are then detected by a scintillation counter including a crystal 24, such as sodium iodide activated by thallium and a directly coupled photo-multiplier tube 25. The scintillation counter further includes a preamplifier 26 wherein all electrical pulses from the photo-multiplier tube, as actuated by the crystal 24, are made substantially equal in length and proportional in magnitude to each of the γ ray quanta detected by the counter. As shown, the scintillation counter combination of crystal 24, photomultiplier tube 25 and preamplifier 26, is preferably enclosed within a further shield 27 constructed of boron in order to prevent thermalized neutrons from entering the detector and further enclosed within a Dewar flask 28 to prevent the extremes in temperatures encountered within the well bore from causing the generation of random pulses in the photomultiplier tube. The electrical pulses from the scintillation counter are of exceptionally short duration (about .25 microsecond in duration) and, when developed from a high intensity neutron source as herein disclosed, result in as many as one million counts per second being generated in the electrical circuit. Accordingly, for a direct transmission system of these pulses to the surface, a band width of at least one megacycle, and preferably more, would be required.

The foregoing frequency requirements in view of the aforementioned limited power and frequency characteristics of the cable 11 require that the electrical pulses from the scintillation counter be converted to a more usable form while still retaining informational characteristics of each of the γ ray quanta detected by the counter. To accomplish this purpose the logging sonde 12 includes further circuitry for the selection and conversion of the short duration electrical pulses into more easily handled waveforms for transmission to the earth's surface with a minimum amount of modification before application to the storage surface 14 of the cathode-ray storage tube 15. This circuitry includes a discriminator 29, a gate generator 30 and a pulse stretcher 31 fed from the preamplifier 26 wherein the electrical pulse from the scintillation counter is converted from a sharp pulse to a stretched rectangular pulse proportional in amplitude to the amplitude of the input pulses. The output of the pulse stretcher 31 is fed to an amplitude comparator 32 where the rectangular waveform is compared to a linear sawtooth voltage developed in linear sweep generator 33 to produce a pulse signal having a time of initiation determined by the amplitude of the electrical signal and, in that manner, the energy of the γ ray detected. The output of the amplitude comparator is fed to a rectangular gate generator 34 of conventional bi-stable multivibrator design which is thereby returned to its normally Off state having been previously turned On by a trigger pulse from the pulse stretcher; a pulse is thus formed having its duration or width determined by the energy level of the γ rays detected by the scintillation counter. The particulars of construction and operation of the foregoing down hole components of the logging tool of the present invention will be more fully explained hereinafter along with the interconnection and coordination of each with the other.

Figure 2:
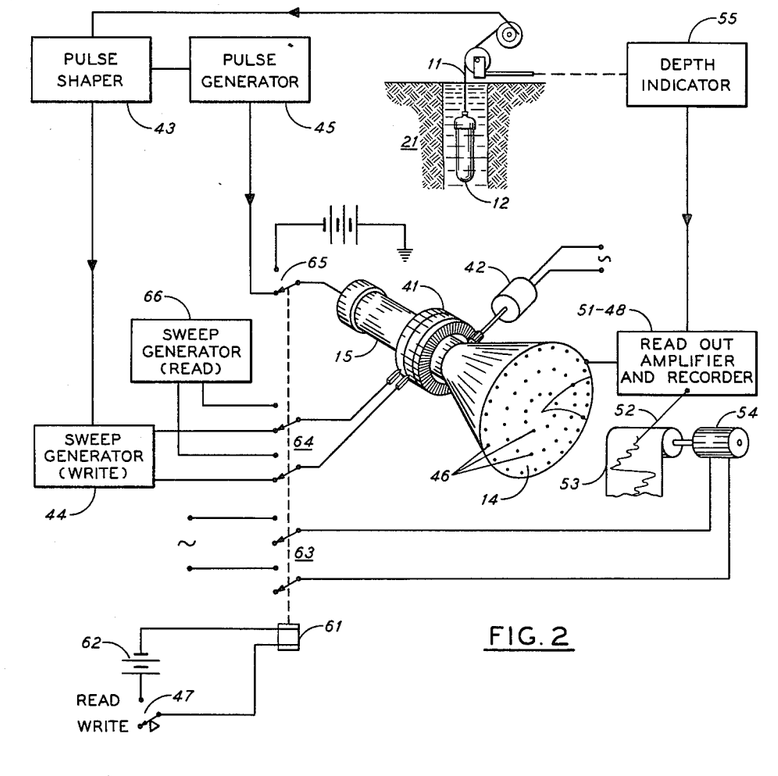
FIG. 2 is a schematic representation of the recording equipment incorporating the method of the present invention and illustrating the manner of positioning the electrostatic charges on the storage surface of the storage tube as contemplated during the writing operation, of the logging procedure.

The output of the rectangular gate generator 34 will be transmitted along the cable 11 to the components of the logging tool located at the earth's surface. The output of the rectangular gate generator will be a rectangular waveform having a time duration proportional to the energy level of the γ ray detected, and, as such, may be used to develop energizations for the storage tube 15. The storage tube 15 is provided with a rotating magnetic deflection coil 41 and a motor 42 is provided for rotating the deflection coil around the electron beam of the storage tube at a constant speed. The individual bits of information derived from the energy of the γ rays detected by the scintillation counter will be stored on the surface 14 of the storage tube 15 as discrete traces as shown in FIG. 2 with the radial distance of these traces from the center of the storage surface proportional to the energy of the γ rays detected. To accomplish this proportionality the rectangular waveform output of the rectangular gate generator 34 transmitted along cable 11 to the components of the logging tool at the earth's surface is fed to a pulse shaper 43 such as the well-known Schmitt trigger circuit where it is reformed for energization of the actuating circuits for the storage tube 15. The pulse shaper 43 provides a pair of outputs constituting a rectangular waveform being fed to a linear sweep generator 44 for initiation of the radial sweep to be applied to the rotating deflection coil and the sharp pulse output of the trigger circuit 43 being fed to a pulse generator 45 to develop a gating pulse for controlling the electron beam of the storage tube 15. Through the application of a linear sweep current derived from the sweep voltage to the deflection coils 41 of the storage tube and the sharp pulse gate from the pulse generator 45 to the electron control elements of the storage tube the information related to the detected γ ray will be positioned on the storage surface 14 of the storage tube 15 in the form of discrete traces 46 radially disposed from the center of the storage surface a distance proportional to the energy of the γ ray detected. As a preferred manner of operation, the radial deflection of the electron beam of tube 15 is such that the low energy γ rays will be represented by traces near the outer periphery of the storage surface 14. Correspondingly, the higher energy traces will be positioned nearer the center of the target surface.

In the form herein specifically shown, this is accomplished in the down hole circuitry wherein the minimum original pulse amplitude results in a maximum pulse width for transmission through the logging cable. This time modulation is stated by the following expression:

$$\Delta t = T - ke \quad (1)$$

where $\Delta t$ = time duration of the time modulated pulse
$T$ = predetermined maximum time for analysis of pulses of the lowest signal level.
$k$ = a proportionality factor
$e$ = the energy of the γ ray In an alternative form, not herein specifically shown, the time modulation of the transmitted signal may take the form expressed as:

$$\Delta t = ke \quad (2)$$

with the symbols having the same meanings as above. The information transmitted in the form of Equation 2 is ultimately converted at the earth's surface to the form of Equation 1 for application to the storage tube.

The above arrangement for distributing the traces has a particular advantage in the recording of neutron capture γ rays where the very high energy rays, i.e., upwards of 7-mev., are of much lower incidence statistically when compared to the γ ray energies of about 1 mev., the ratio being about 1000:1. Thus, it will be seen that utilizing the relatively large circumferential area around the outer periphery for the low energy γ ray pulse storage will permit more effective use of the area of the storage target 14.

The storage tube 15 is of conventional construction and is provided with electrically actuatable elements for reading out the information stored on the storage surface 14 thereof. The energization of the readout elements of the storage tube 15 is more fully explained in the aforementioned copending applications with reference herein to its operation being merely that the information stored on the storage surface 14 may be converted to electrical signals for energization of a readout amplifier and recorder. A read and write control switch is provided at 47 for disconnecting the electron beam circuit of the storage tube 15 from the pulse actuating elements 45 and for connecting it to a D.C. bias voltage. A pulse counter 49 is provided to be actuated by the pulse generator 45 and, as has been hereinbefore indicated, the read and write control switch 47 may be either automatically operated by the pulse counter to provide a readout arrangement after a predetermined number of pulses have been stored on the storage tube or the read and write control switch may be manually operated to perform the same function. The readout amplifier 48 drives a readout recorder 51 having, as shown in FIG. 2, a stylus 52 for indicating on a record paper 53 the information stored on the storage surface 14. The record paper 53 is preferably driven by a constant speed motor 54.

A depth indicator 55 mechanically driven by the cable reeling mechanisms provides an output to the readout recorder 51 for indication on the record 53 of the location within the well bore of the γ ray spectra being recorded.

The readout of the information stored on the surface 14 of tube 15 is accomplished in the manner defined in my aforementioned copending application. In that application the electron beam is deflected by means of electrostatic deflection plates whereas in this application the electron beam is deflected by electromagnetic deflection coils with the coils rotating around the electron beam to provide the circular pattern of stored information as illustrated on the storage surface of the storage tube in FIG. 2. Readout is accomplished by deflecting an electron beam from the same electron gun in a spiral path starting from the exterior of the storage surface 14 and moving in a gradual spiral toward the center thereof. As an alternative the spiral sweep may originate at the center of the storage surface and move outward to the periphery.

In writing on the storage surface of the storage tube, the sweep generator 44 is actuated to produce a linear sawtooth sweep having a duration sufficient to deflect the electron beam across the radial dimension of the storage surface so that the electron beam of the storage tube 15 is deflected toward the periphery of the storage surface 14. The deflection coils 41 are continuously rotated around the electron beam by means of the motor 42 so as to effect a random positioning of the electrostatic charge modification of the storage surface 14 at the radial distance corresponding to the desired γ ray energy.

In FIG. 2 is illustrated a switching arrangement for connecting the cathode-ray tube 15 for both reading and writing. The read and write control switch 47 is indicated as controlling the energization of a solenoid 61 by a battery 62, having mechanical connections with a plurality of switches 63, 64 and 65. In the position of the circuit as shown in FIG. 2 the storage tube 15 is connected for writing operation. With the solenoid 61 energized each of switches 63, 64 and 65 will be moved in an upward direction, as viewed in FIG. 2, to connect the switches to the other of the contacts shown; switch 63 is operative to energize the drive motor 54 for the recorder 51, switch 64 removes the sawtooth sweep from generator 44 for the deflection coil and connects the sweep generator 66 generating the aforementioned spiral sweep waveform, and switch 65 disconnects the electron beam control portions of the storage tube 15 from the pulse generator 45 and connects it to a D.C. bias voltage to energize the storage tube for its readout operation.

Figure 4:
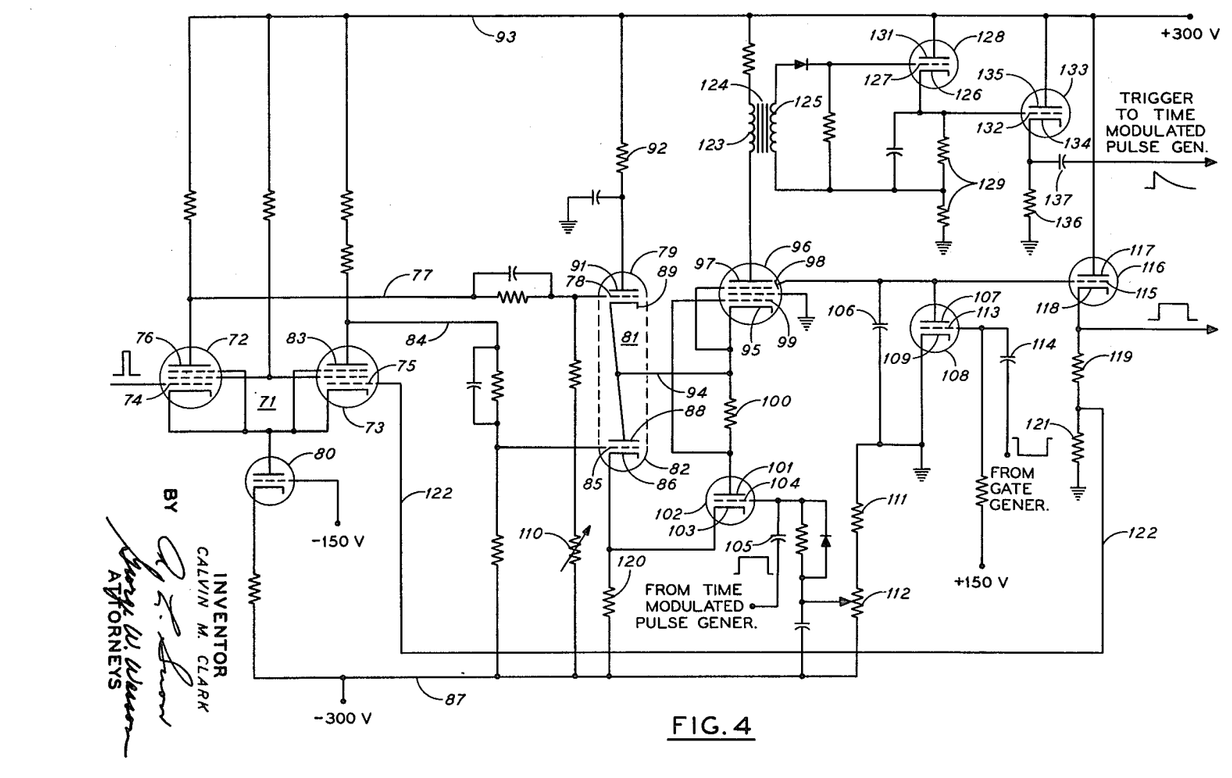
FIG. 4 is a schematic circuit diagram of the pulse stretcher of the present invention.
Figure 5:
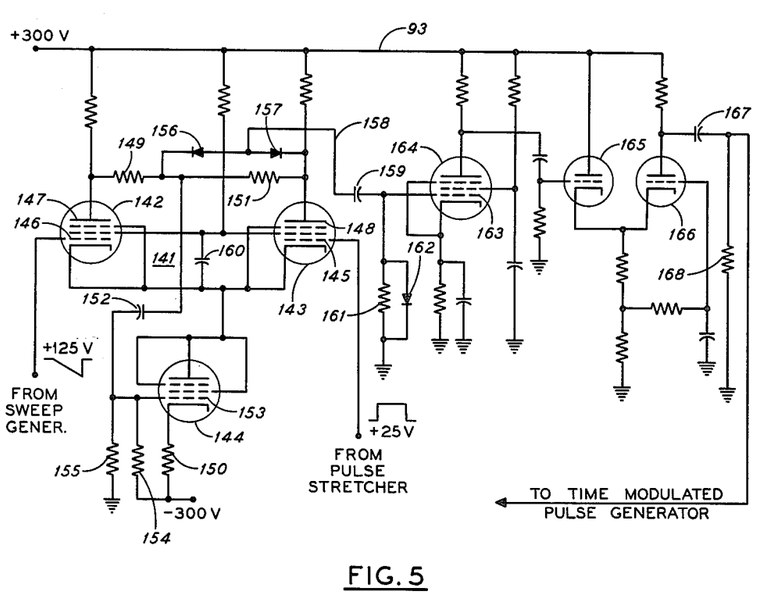
FIG. 5 is a schematic circuit diagram of the amplitude comparator of the present invention.

The circuits for converting the output of the scintillation counter from pulses of high frequency and short duration will now be described. As has been previously explained the cable 11 is incapable of handling the pulses in the form derived from the scintillation counter necessitating the conversion of these pulses to a more usable form. The circuit diagrams of FIGS. 4 and 5 illustrate the pulse stretcher and amplitude comparator circuits for converting the scintillation counter output from a pulse having an amplitude proportional to the energy of the γ ray it represents to a pulse having a time duration proportional to the amplitude of the detected γ ray.

The output pulse of the preamplifier 26 passing through the discriminator 29 is fed to the pulse stretcher circuit including a difference amplifier circuit 71 comprising a pair of vacuum tubes 72 and 73. The pulse, with its amplitude proportional to the energy of the γ ray detected, is applied to the control grid 74 of tube 72 and a feedback signal is applied to the control grid 75 of tube 73 derived from a source to be explained hereinafter. The anode 76 of tube 72 is connected by conductor 77 to the control grid 78 of a vacuum tube 79 of a two-tube series amplifier 81 having as the second stage a vacuum tube 82, the anode 83 of tube 73 being connected by a conductor 84 to the control grid 85 of the tube 82. Conduction through tubes 72 and 73 is controlled by constant current device tube 80 such that the total current through the two tubes remains constant to be proportioned between the two tubes. The cathode 86 of tube 82 is connected to a negative potential source at conductor 87 and the anode 88 is connected to the cathode 89 of tube 79. Anode 91 of tube 79 is connected through a suitable voltage dropping resistor 92 to a source of positive potential at conductor 93. The junction of anode 88 of tube 82 and cathode 89 of tube 79 is connected by conductor 94 to the cathode 95 of a vacuum tube 96 of the secondary emission type. Tube 96 has an anode 97, a dynode 98, a control grid 99 and other conventional elements usual with a tube of the type shown. The cathode 95 of tube 96 is connected through a load resistor 100 to the anode 101 of a tube 102 having its cathode 103 connected through circuit means to the negative potential at conductor 87. Control grid 104, of tube 102 has applied thereto, through a coupling capacitor 105, a gating pulse from a source to be described hereinafter, and an adjustable D.C. bias from potentiometer 112 serially connected with resistor 111 to provide a voltage divider network connected between ground and the conductor 87.

The dynode 98 of tube 96 is connected to one side of a capacitor 106 and to the anode 107 of a tube 108 the cathode 109 of which is connected to the other side of the capacitor 106 and through circuit means to ground. The control grid 113 of tube 108 has a gating pulse applied thereto from a source, to be later described, through a coupling capacitor 114 and is further connected by circuit means to a source of potential positive with respect to the cathode 109. The anode 107 is directly connected to the control grid 115 of a vacuum tube 116 operating in a cathode-follower circuit with its anode 117 connected to the positive source at conductor 93 and its cathode 118 connected through load resistors 119 and 121 to ground. The junction of resistors 119 and 121 is connected by conductor 122 to the control grid 75 of the tube 73 applying the previously defined feed back to that tube.

Referring again to tube 96, its anode 97 is connected through the primary 123 of a transformer 124 to the positive potential at conductor 93. The secondary 125 of the transformer is connected through circuit means to the cathode 126 and control grid 127 of a vacuum tube 128 operating as a so-called "bootstrap" cathode follower amplifier with the cathode 126 connected through load elements 129 to ground and the anode 131 connected to the positive potential at conductor 93. Cathode 126 is also directly coupled to the control grid 132 of a vacuum tube 133 operating as a cathode follower and having its cathode 134 connected through load means to ground and its anode 135 connected to the positive potential at conductor 93. A load resistor 136 is provided in the cathode circuit and a coupling capacitor 137 is connected to pick off this pulse for triggering the time modulated pulse generator 34 as will be more fully described hereinafter.

The circuit elements just described constitute a pulse stretcher for the pulse height analyzer and operate in the following manner:

Pulse stretching is accomplished by charging capacitor 106 to a positive potential with current flowing through the dynode 98 of tube 96; the eventual charge is made proportional to the peak value of the input pulse to tube 72 by means of the feedback circuit through conductor 122.

With no input signal, the capacitor 106 is kept discharged by the normally conducting tube 108. Tube 108 is driven into cut-off before an input pulse to the capacitor 106 reaches its maximum height by a negative gating pulse through coupling capacitor 114 derived from the input discriminator circuit 29 and gate generator 30 fed through the preamplifier 26. In this manner the pulse stretcher circuit provides an output only with input signals of a predetermined voltage level.

Tube 96 is biased at, or close to, cut-off by the voltage drop across the load resistor 100 of tube 102 in its cathode circuit with the control grid 99 connected to be negative with respect to the cathode 95. The cathode potential of tube 96 is adjusted by variable resistor 110, in the control grid circuit of tube 79, such that the steady state cathode-dynode potential results in an electron secondary emission ratio of the dynode in tube 96 near unity. This control of the cathode potential is accomplished by the D.C. coupling of the grid 78 of tube 79 to the anode of tube 72 through a voltage divider network including variable resistor 110. Adjustment of resistor 110 will change the D.C. voltage on grid 78 and, because tube 79 is essentially a cathode follower, the cathode 89 will move with the grid 78. The cathode 95 of tube 96, being directly connected to cathode 89 of tube 79 will be moved to the same adjusted potential. In the foregoing manner the potential difference between the dynode 98 and the cathode 95 is adjusted to maintain the electron secondary emission ratio of the dynode near unity or a net dynode current of zero. The current through tubes 79 and 82 controls the potential on the cathode 103 of tube 104 and this, along with the grid-bias potentiometer 112, controls the conduction through that tube and therefore the grid-cathode voltage of tube 96.

When an input pulse appears at control grid 74 of tube 72, the amplified signal is applied push-pull to the two tube series amplifier tubes 79 and 82. The amplified signal through tube 72 is fed to the control grid 78 of tube 79 and the amplified signal through tube 73 is fed to the control grid 85 of tube 82. The initial amplified signal from tube 72 drives the grid 78 of tube 79 negative toward cut-off thus reducing current flow through tube 79 and allowing cathode 89 to move negatively. At this time tube 82 is caused to conduct more heavily by the positive signal on grid 85. Current flow through tube 82 then passes through tube 96 because of the conduction condition of tube 79. The heavier current through tube 82 increases the voltage drop across the resistor 120 in the common cathode circuit of tube 82 and tube 102; thus effectively cutting off tube 102 and further decreasing the current through tube 79 thus reducing the negative bias between grid 99 and cathode 95 of tube 96. The cathode 95 of tube 96 is now sufficiently negative with respect to the dynode 98 that the flow of electrons through the tube causes a secondary emission ratio greater than unity and a net electron current will leave the dynode and be accelerated through tube 96 to the anode 97. These electrons are available to the dynode 98 from the capacitor 106 and thus a rapid charging of capacitor 106 is effected. The charge on capacitor 106 and the potential of the dynode 98 permits increased current flow through tube 116 causing a positively increasing voltage to appear across the load resistors 119 and 121 in the cathode circuit thereof. This positively increasing voltage is fed back by conductor 122 to the control grid 75 of tube 73 to increase the current flow through this tube and, because of the constant current control of tube 80, decrease the current through tube 72. The increase in current through the load resistor in the anode circuit of tube 73 decreases the voltage at grid 85 of tube 82 causing a decrease of current through tube 82 and resistor 120, allowing tube 102 to begin to conduct again. At the same time, the decrease in current through tube 72 allows the grid 78 of tube 79 to become more positive to permit increased current flow through the tube 79 and cause cathode 89 to return to a more positive condition; this increased current in tube 79 and the increased current through tube 102 changes the bias between cathode 95 and grid 99 of tube 96 to return the grid 99 to a controlling potential.

The above voltage movements of the various elements of tubes 72, 73, 79, 82, 102 and 116 are effected extremely rapidly thus giving capacitor 106 a very rapid charge and a sharp rise to the waveform as shown adjacent to tube 116. Capacitor 106 continues to charge until the voltage fed back by conductor 22 to grid 75 of tube 73 equals the input signal voltage to grid 74 of tube 72 at which time there will no longer be an error signal between tubes 72 and 73 and therefore no error signal to the tube 79 and 82 to keep tube 96 conducting as above. Capacitor 106 will remain charged until the gating pulse from gate generator 30 through capacitor 114 is removed from the grid 113 and during this period tube 116 will continue to conduct to produce a stretched pulse having an amplitude proportional to the amplitude of the input signal from the preamplifier 26. When tube 108 is gated into conduction, capacitor 106 will be rapidly discharged and tube 116 will terminate its conduction.

The termination of current flow through tube 96 when there is no error to tubes 72 and 73 initiates a pulse in the secondary 125 of transformer 124 for application between the grid 127 and the cathode 126 of tube 128. The output of tube 128 is fed to cathode follower tube 133 to provide a low impedance pulse for triggering On the time modulated pulse generator through capacitor 137. The positive rectangular waveform output of the time modulated pulse generator, as hereinafter defined, is fed to the control grid 104 of tube 102 through coupling capacitor 105 causing a surge of current through tube 102 to prevent the pulse stretcher from becoming responsive to a second input signal during the period it is developing a pulse in response to an input signal from the pre-amplifier 26.

The output stretched pulse from the signal indications derived through the circuits of FIG. 4 is fed to the amplitude comparator circuit 32 for comparison to a linear sweep signal from sweep generator 33. In the comparator circuit a signal is produced having a time of initiation, relative to the sweep start, determined by the energy of the γ ray of the original signal indication from which the stretched pulse was produced. The amplitude comparator circuit 32 constitutes a discriminator 141 including vacuum tubes 142, 143 and 144 with tube 144 operating as a constant current device for tubes 142 and 143. The stretched pulse output from tube 116 of FIG. 4 is fed to the control grid 145 of tube 143 and a linearly decreasing sawtooth type sweep is fed to grid 146 of tube 142 from sweep generator 33. The anodes 147 and 148 of tubes 142 and 143, respectively, are connected through equal load resistors to the source of positive potential at conductor 95 and a pair of equal series resistors 149 and 151 interconnect the two anodes. At the junction of the two resistors a feedback signal is picked off through capacitor 152 and fed to the control grid 153 of tube 144 to provide a negative feedback helping to keep the reference value of the output signal constant, as will be seen hereinafter. The control grid 153 is biased to a desired constant current operating condition by the unbypassed resistor 150 in the cathode circuit and the voltage divider network of resistor 154 and 155. Further stabilization of the reference value of the output signal is provided by the capacitor 160 coupling the screen grids and cathodes of both tubes 142 and 143.

A pair of diodes 156 and 157 are connected in series with their anodes back-to-back, between the junction of the resistors 149 and 151 and the anode 148 of tube 143 so that the signal output of the discriminator circuit may be picked off at the junction of the two diodes by conductor 158.

The output of the discriminator circuit is applied through conductor 158 to a differentiating circuit comprising capacitor 159 and resistor 161 shunted by diode 162. The differentiated signal is applied to the control grid 163 of vacuum tube 164 operating as a conventional amplifier stage having its amplified output fed to additional amplifying stages in tubes 165 and 166 operating as cathode-coupled amplifiers. The output of tube 166 is fed through a differentiating circuit of coupling capacitor 167 and resistor 168 for triggering Off the time modulated pulse generator 34 as will be more fully described hereinafter.

The operation of the foregoing circuits is as follows: The control grids 145 and 146 of tubes 143 and 144, respectively, are biased such as that in a quiescent condition tube 142 is conducting heavily causing tube 143 to be cut off, this because of the lower positive potential on grid 145 and the constant current control of tube 144. The quiescent current through tube 144 is determined by resistor 150 and the biasing voltage divider network of resistors 154 and 155. The baseline of the negative going sawtoothed sweep input to tube 142, as shown adjacent to the grid 146 from the sweep generator 33 of conventional design, is more positive than the positive peak of a stretched pulse input to tube 143, as shown adjacent to grid 145, from the previously described pulse stretcher 31, so that tube 143 cannot conduct until the sweep on grid 146 of tube 142 has reduced this grid voltage to within about 5 volts of the voltage on grid 145 of tube 143. When the voltage on the two grids become substantially equal both tubes will conduct and there will be substantially no difference voltage between the anodes 148 and 147 of the two tubes and therefore no signal output. Before this condition of substantial equality between grid voltage and when tube 143 is cut off, the cathodes of tubes 142 and 143 are following the negatively going sweep on the grid 146 and the voltage at the junction of the two resistors 149 and 151 remains substantially constant as do the voltages at the anodes of tubes 142 and 143; this is the result of the action of the constant current tube 144 and the maintenance of a constant screen-cathode potential for tubes 142 and 143 by the screen-cathode coupling capacitor 160.

Any variation in the reference voltage at the junction of the two resistors 149 and 151 is applied to the grid of the constant current tube 144 in a manner such that as the sweep signal on grid 146 moves negatively the bias on tube 144 is changed so as to maintain substantially constant the current therethrough, thus maintaining the reference point voltage substantially constant. The potential at the junction of the two diodes 156 and 157 will be held effectively at the reference junction voltage until the signals on grids 145 and 146 cause the voltages at anodes 148 and 147, respectively, to become equal. With the anode 148 potential positive relative to the reference junction point, the forward resistance of diode 156 is very small relative to the back resistance of diode 157 and the voltage drop across diode 156 is very low compared to that across diode 157. When tube 143 begins to conduct, as the signals on grids 145 and 146 become nearly equal, the current through its load resistor will result in the anode voltage moving in a less positive direction while the simultaneous decrease of current through tube 142 and its load resistor will result in the anode voltage of tube 142 moving in a more positive direction; the central reference voltage at the junction of resistors 149 and 151 is therefore held constant. At the instant the anode voltage of tube 143 swings negative with respect to the reference junction voltage, when the potentials on grids 145 and 146 are substantially equal, the relative resistances of diodes 156 and 157 will reverse, and the potential at their junction will move with that of the anode 148 of tube 143. The voltage at anode 148, and at the diode junction, continues to swing rapidly negative with the sawtooth signal until tube 142 is cut off and tube 143 conducts fully. The anode potentials remain at these new levels until the signals are removed from the two grids 145 and 146. The resulting negative step signal from the diode junction is differentiated by capacitor 159 and resistor 161 and applied to control grid 163 of tube 164.

The signal to the grid 163 will be a single ended negative pulse through the provision of the bypass diode 162 and the diodes 156 and 157 which allow for the rapid removal of the charge on capacitor 159 and for a low resistance path around the resistor 161 across which the signal for grid 163 is developed.

The output of tube 164 is applied to the grid of tube 165 in the conventional manner. Tubes 165 and 166 constitute a cathode-coupled clipper-limiter amplifier with the clipped signal taken from the cathode circuit of the tube 165 being applied to the cathode of the grounded grid amplifier tube 166. The amplified and limited output of tube 166 is taken from the anode circuit and differentiated through coupling capacitor 167 and resistor 168 to produce a sharp positive pulse for the triggering Off function in the time modulated pulse generator.

The time modulated pulse generator 34 is a conventional bi-stable multivibrator circuit for generating a rectangular pulse output having a time duration determined by the triggers from the pulse stretcher and the amplitude comparator. The discriminator circuit 29 selects the electrical pulses produced by the photo-multiplier tube 25 falling within a predetermined energy range thus providing an initial screening against undesired low energy information. A trigger output of the discriminator 29 initiates the operation of a bi-stable multivibrator circuit of the gate generator 30 to activate the pulse stretcher 31. The selected pulses from the discriminator 29 are fed to the pulse stretcher 31 for widening while retaining their relative amplitudes.

The widened pulses from the pulse stretcher 31 are then fed to the amplitude comparator 32. Another output of the pulse stretcher 31, as previously described, is used for triggering On the time modulated pulse generator. The output of time modulated pulse generator, in addition to being fed up the logging cable 11, actuates the sweep generator 33 and energizes a blocking circuit in the pulse stretcher 31 to eliminate interference from other signals during a period that a selected pulse is being stretched. The linear sweep generator generates a negative-going linear sawtooth waveform which is the other input to the amplitude comparator 32.

The output of the amplitude comparator 32 is a pulse signal indicating the instant of equality of the stretched pulse 31 and the sawtooth waveform. This output is fed to the time modulated pulse generator 34 to terminate or trigger Off the aforementioned rectangular pulse. Connections are provided, as shown in FIG. 1, between the rectangular gate generator 34, the linear sweep generator 33 and the pulse-stretcher 31 so that, upon termination of the rectangular pulse from the gate generator 34, the pulse-stretcher 31 will be prepared to handle a subsequent signal from the preamplifier 26 and the linear sweep generator 33 will be prepared to initiate a new sawtooth waveform.

The operation of the apparatus of the present invention should be readily apparent in view of the foregoing descriptions. The detected individual neutron-generated $\gamma$ ray quanta produced by the radiation from the neutron source 22 in its bombardment of the constituent elements of the formation 21 are converted into electrical pulses by the crystal 24 and photo-multiplier tube 25 and amplified by the pre-amplifier 26. The discriminator 29 and gate generator 30 energize the pulse-stretcher 31, as above described. The outputs of the pulse-stretcher 31 and the linear sweep generator 33 actuate the amplitude comparator 32 to develop a pulse indicating the equality between a signal proportional in amplitude to the scintillations detected and a linear sweep voltage. The output of the amplitude comparator 32 along with the output pulse from the discriminator 29 trigger the time modulated pulse generator 34 to produce a pulse having a predetermined amplitude and a time duration proportional to the energy of the neutron induced $\gamma$ ray quanta detected by the crystal 24. This pulse, as distinguished from the low-powered, high frequency signal from the preamplifier 26 is fed along the cable 11 to the components of the nuclear spectroscopy apparatus of the present invention at the earth's surface, and, as shown in FIG. 1, will be received by these components in the somewhat degraded form as an input to the pulse shaper 43. The indications of $t_1$ and $t_2$ on this input waveform are the important characteristics of the transmitted waveform and will require sharpening in the pulse shaper 43 to produce the sharpened rectangular waveform output as illustrated. The differentiated output of the pulse shaper 43 that is coincident with the trailing edge of the rectanguar waveform at $t_2$ actuates the pulse generator 45 to produce a sharp pulse of very short duration. The rectangular waveform output actuates the linear sweep generator 44 for the storage tube 15. The output of the pulse generator 45 is fed to the electron control portions of the storage tube 15 to energize the storage tube at the time predetermined by the downhole components of the nuclear spectroscopy apparatus. The linear sweep generator output is fed to the magnetic deflection coils 41 after conversion from a voltage waveform to a current waveform to produce the desired deflection of the electron beam for positioning the traces as shown in FIG. 2 at 46. It should be apparent that the electron gun is actuated to cause charge modifications of the storage surface 14 in circular paths about the center of the storage surface 14 in accordance with the energy of the $\gamma$ ray quanta detected.

At this point in the operation of the present invention the individual $\gamma$ ray quantum detected by the downhole components of the apparatus are positioned upon the storage surface 14 as radially disposed charge-modified portions of the storage surface in accordance with the energy of the determination of the constituent elements of the earth's formation 21. Upon actuation of the read-write control switch 47, either after a predetermined number of pulses or after a predetermined time period, the storage tube 15 will be switched from its write operation to a read operation wherein the information stored as electrostatic charge modified portions of the storage surface 14 is readout for recording. The readout, as has been described, is preferably accomplished by deflecting the electron beam of the storage tube 15 in a spiral path from the periphery of the storage surface in a gradually decreasing manner towards the center of the storage surface either in a linear path or in gradual steps producing a series of circular traces each of a reduced diameter of a predetermined increment. The signal produced upon readout scanning of the storage surface 14 and optionally filtered to improve the signal to noise ratio, is amplified by readout amplifier 48 to be fed to the readout recorder 51 along with an indication from the depth indicator 55 of the position of the sonde 12 within the well bore 13. The recorder 51 drives a stylus 52 to produce the indication on the record paper 53 of a nuclear spectroscopy graph of conventional formation whereby those familiar with the art may determine the constituent elements of the well bore constituting the earth formation 21.

Figure 3:
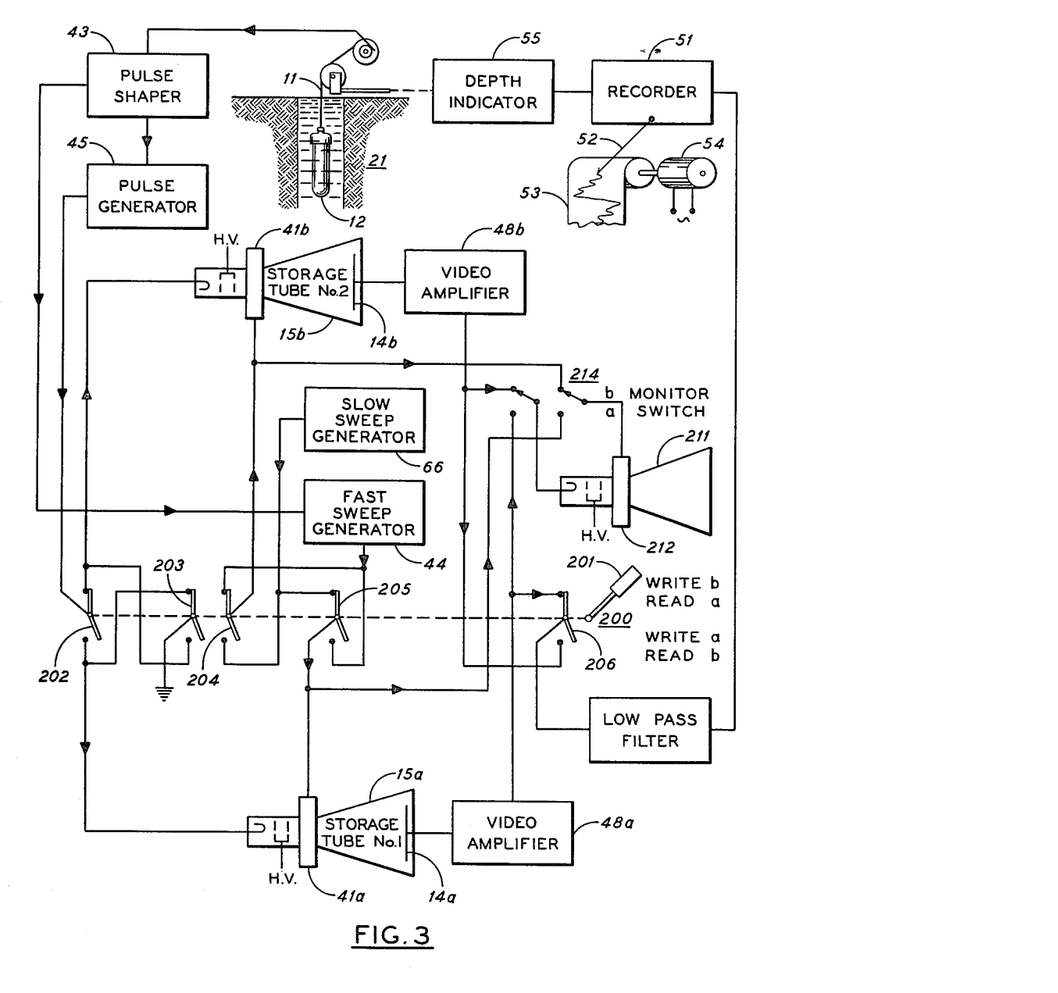
FIG. 3 is a schematic representation of a continuously operable well logging system incorporating the method of the present invention.

In FIG. 3 is illustrated a continuously operable nuclear spectroscopy system for recording nuclear energy spectra of a well bore or the like. Like components of this circuit and the apparatus of the foregoing description are designated by the same reference numerals with subscripts "a" and "b" to associate the elements with their respective sections. As shown in the drawing, the sonde 12 incorporating the downhole components of the nuclear spectroscopy system is supported on a cable 11 transmitting its signal to the pulse shaper 43 and pulse generator 45. The output of the pulse generator 45 is fed selectively to either of two complete recording units through a multi-blade switch 200 having an operating handle 201 and including double pole, double throw switching elements 202 through 206. Each of the recording sections include a cathode-ray storage tube, 15a and 15b with magnetic deflection coils 41a and 41b and storage surfaces 14a and 14b. A single fast sweep generator 44 is provided for writing and a pair of video amplifiers 48a and 48b are provided for readout and monitoring.

A monitoring cathode-ray oscilloscope 211 is provided for viewing the information being stored in a readout of the storage tubes 15a and 15b and a rotating magnetic deflection coil 212 is provided for the monitor scope. A single slow sweep generator 66 is provided for the readout sweep drive to the magnetic deflection coils 41a, 41b and 212 and the fast sweep generator 44 is connectable to the deflection coil 212 for the writing sweep thereon. It should be understood that a common drive motor may be provided for all of the rotating magnetic deflection coils or each may be driven separately. The common drive being preferred in view of the synchronization it would provide.

The continuous nuclear spectroscopy system of this figure includes a recorder 51 and a depth indicator 55 for actuating the stylus 52 for recording on the record chart 53 driven by the motor 54.

The operation of the continuous system is such that while one section of the system is operating as a storage circuit the information previously stored in the other sections may be read out and recorded in the manner previously defined with respect to FIGS. 2 and 3. The monitor oscilloscope 211 may be connected either to view the information being read from one of the sections or to indicate the information being stored in one of the sections by the operation of a monitor switch 214.

With switch 200 in the position as shown in FIG. 3 section b of the apparatus will be actuated for writing and the storage of nuclear spectroscopy information on the storage surface 14b of storage 15b. Switch 202 will connect the output of the pulse generator 45 to electron generating elements of the proper storage tube for storage operation and switch 203 will connect the electron generating elements of the other storage tube for reading operation. Switches 204 and 205, at the same time select the proper sweep for the respective operations. Switch 206 will connect the proper video amplifier 48a or 48b to the recorder 51 through the filter circuits if desired. While switch 200 has connected the components of the b circuit for writing and the components of the a circuit for reading, the conductors of FIG. 3 have connected to the monitor switch 214 the proper sweeps and signals to permit that switch to select the desired patterns for viewing. With switch 214 in the position shown the monitor oscilloscope 211 will be actuated by the signals being stored on tube 15b as passed through the video amplifier 48b and the deflection coil 212 will be energized by the fast sweep 44. With the switch 214 in its a position, the oscilloscope will be actuated by the signals being read from the storage tube 15a through video amplifier 48a and the deflection coil 212 will be energized by the slow sweep 66.

The reversal of switch 200 will reverse the conditions of sections a and b and will change the energization of the monitor oscilloscope 211 in accordance with the changes effected by the operation of the master switch.

The foregoing descriptive matter has illustrated the use of the present invention in one preferred mode of operation as a well logging tool for determining the constituent elements along a well bore or the like. The invention should not be restricted to the particular grouping or split of the apparatus illustrated in that the invention is equally applicable to well logging systems having all the detecting and recording apparatus down-hole within a sonde as well as to a system having only the initial scintillation pulse producing sections down-hole and all of the pulse forming, shaping and resolving sections at the earth's surface along with the recording facilities.

The invention has additional applications in the analysis of complex waveforms of considerably lower relative frequency in which the information derived from the complex waveform may be a piecing together of information resolved from incremental portions of the original complex waveform. In that application of the invention the apparatus will be actuated by small portions of the waveform rather than high frequency signals as this preferred form illustrates and will perform its duty by collecting and storing information concerning the waveform for later analysis and/or regrouping.

This invention has further applications in the general art of nuclear spectroscopy aside from the preferred form herein illustrated. In other obvious applications the invention may be used to detect not only the presence but also the amount of a selected element present in a sample or particular location. In this respect heretofore difficult medical or spectral analyses may be readily handled to produce a display of a long duration analysis or a group of shorter period analyses.

It should be understood that while the apparatus herein disclosed specifically illustrates cathode-ray tube storage devices employing rotating electromagnetic deflection coils, this application is not so restricted in that the coils may be retained physically stationary and deflecting field thereof may be caused to rotate by suitable electrical energization. Furthermore, the operation of the circuits of this invention are equally applicable to cathode-ray storage tubes employing electrostatic deflection means providing the rotating field as is herein described with the electromagnetic deflection system.

The invention is not restricted to the specifically disclosed method and circuitry for accomplishing amplitude-to-time conversion. Alternatively, non-linear sawtooth waveforms, such as exponential, parabolic, hyperbolic, or similar functions, may be employed instead of the linear sawtooth waveform illustrated. Also, the functions of the sweep generator, pulse-stretcher, amplitude-comparator and time modulator may be combined wholly or in part, in a single circuit, as for example, the well-known phantastron. Other pulse-stretching and/or amplitude-comparison circuits well known in the art may be substituted for the circuits shown.

While a certain preferred embodiment of the present invention has been specifically disclosed, it is understood that the invention is not limited thereto, as many variations will be readily apparent to those skilled in the art and the invention is to be given its broadest possible interpretation within the terms of the following claims.

I claim:

1. The method of storing a discrete bit of information having a distinct characteristic on a storage surface of a cathode ray storage tube comprising the steps of generating a discrete pulse having a distinct amplitude representing the distinct characteristic of said bit of information, stretching said discrete pulse to a predetermined time duration while retaining said distinct amplitude, initiating a linearly sloping sawtooth waveform signal in synchronism with the initiation of said stretched pulse, the maximum amplitude of said sawtooth waveform being at least as large as the largest distinct amplitude of said information to be stored, comparing the amplitude of said stretched pulse to the amplitude along said sawtooth waveform, generating an electron beam within said storage tube, directing said electron beam toward said storage surface, rotating a deflection means about said electron beam and energizing said deflection to sweep said beam radially outwardly from the center of said storage surface in accordance with the position of said rotating deflection means, initiating the energization of said deflection means at the beginning of a discrete pulse, and gating said electron beam upon the occurrence of equality in amplitude between the stretched pulse and the sawtooth signal initiated by the said discrete pulse initiating said deflection means energization to produce a portion of a trace on said storage surface at a distinct radial distance from the center of said storage surface in accordance with said distinct characteristic of said information.

2. Apparatus for positioning information on the storage surface of a cathode ray storage tube at distinct radial distances from the center of said storage surface in a circular sweep pattern, said distinct radial distances being determined in accordance with a distinct characteristic of said information, comprising:

(a) means for generating an electron beam within said storage tube including means for directing said beam toward said storage surface and means for deflecting said beam, means for rotating said deflecting means about said beam, means for energizing said deflecting means to sweep said beam outwardly from the center of said storage surface in a plurality of radial sweep paths to form said circular sweep pattern, (b) means for generating a plurality of discrete signal pulses varying in amplitude in accordance with said distinct characteristic of said information, means for stretching said discrete pulses to a predetermined time duration while retaining said amplitude of each pulse proportional to said distinct characteristic, means for generating a repeating plurality of linearly sloping sawtooth waveform signals of equal time duration to said stretched pulses, means for synchronizing the initiation of a sawtooth waveform with the initiation of each of said stretched pulses to establish a sawtooth waveform with respect to each stretched pulse, means for comparing the amplitude of each of said stretched pulses to the increasing amplitude along the sawtooth waveform generated by that stretched pulse, means for generating a second signal upon occurrence of amplitude equality between said compared stretched pulse and its respective sawtooth waveform, means for generating a time modulated information signal initiated with the beginning of said discrete signal pulses and terminating with said second signal, (c) means for synchronizing the energization of said deflecting means with the beginning of said information signal to initiate an outward radial sweep of said electron beam, and means for gating said electron beam upon a termination of said information signal to produce a portion of a trace at a distinct radial distance from the center of said storage surface in accordance with said distinct characteristic of said information and at a position on said storage surface determined by the rotated position of said deflecting means.

References Cited in the file of this patent

UNITED STATES PATENTS

| | | |
|---|---|---|
| 2,444,036 | Crost | June 29, 1948 |
| 2,611,105 | Nadir | Sept. 16, 1952 |
| 2,885,596 | Kaufmann | May 5, 1959 |